United States Patent

Nakagome et al.

[15] 3,668,328

[45] June 6, 1972

[54] TIME-DIVISIONAL CONNECTION SYSTEM FOR A PLURALITY OF DIGITAL COMMUNICATION CIRCUITS

[72] Inventors: Yukio Nakagome; Hiroichi Teramura; Yasuo Fukata, all of Tokyo; Sumitoshi Ando, Ohmiya, all of Japan

[73] Assignee: Kadusai Denshin Denwa Kabushiki Kaisha, Tokyo-to, Japan

[22] Filed: Mar. 26, 1970

[21] Appl. No.: 22,805

[30] Foreign Application Priority Data

Mar. 26, 1969 Japan....................................44/22395

[52] U.S. Cl.............................................179/15 AQ, 178/58
[51] Int. Cl...........................................................H04j 3/00
[58] Field of Search............................178/50, 52, 53, 58, 78; 179/15 AQ

[56] References Cited

UNITED STATES PATENTS 3,238,298 3/1966 Willis.......................................178/50
3,300,763 1/1967 Hoehmann..............................178/50
3,435,142 3/1969 Crowson et al..........................178/73

*Primary Examiner*—Kathleen H. Claffy
*Assistant Examiner*—David L. Stewart
*Attorney*—Robert E. Burns and Emmanuel J. Lobato

[57] ABSTRACT

A time-divisional connection system for a plurality of digital communication circuits for connecting time-divisionally, for each communication circuit in a characterwise manner, between one and the other of each pair of two-way digital communication circuits by means of four-wire terminal equipment. The system includes a detector for detecting time-divisionally, for each communication circuit, whether or not a time-serial character exists at one of the input and output terminals of the four-wire terminal equipment for each communication circuit, and means responsive to the output of the detector for interrupting one of two paths from the input terminals to the output terminals of each communication channel in the four-wire terminal equipment during the duration of the detected character or characters in order to prevent an undersired sending-out or receiving of the detected time-serial character signal.

4 Claims, 6 Drawing Figures

TIME-DIVISIONAL CONNECTION SYSTEM FOR A PLURALITY OF DIGITAL COMMUNICATION CIRCUITS

This invention to a time-divisional connection system for a plurality of two-way digital communication circuits and more particularly to a system for connecting time-divisionally between one and the other of each pair of two-way digital communication circuits by means of four-wire terminal equipment.

In digital communication systems such as telegraph or data communication systems, a switchboard and a number of subscriber devices are generally connected by two-wire circuits through which sending information and receiving information are bidirectionally transmitted, while the switchboard is constructed in accordance with a four-wire system and the sending terminal and the receiving terminal of each circuit are separately provided. Accordingly, each of the two-wire circuits and the switchboard are connected through a repeating relay circuit which acts as a two-wire to four-wire converter. Moreover, the repeating circuit must have an additional function for checking direct-coupling between the sending terminal and the receiving terminal of each digital communication circuit. In other words, the additional function is so designed that the sending signal from the switchboard is transmitted to the subscriber device of the digital communication circuit while the same sending signal does not reach the corresponding receiving terminal of the digital communication circuit, and that the receiving signal transmitted from the subscriber device is not directly transferred to the corresponding sending terminal of the digital communication circuit. Therefore, a number of above-mentioned repeating relay circuits must be provided for respective digital communication circuits to prevent the above mentioned direct-coupling between the sending terminal and the receiving terminal of each digital communication circuit. This is undesirable for reasons of cost of construction, reliability, and/or space requirements for the circuitry of the switchboard.

An object of this invention is to provide a time-divisional connection system for a plurality of two-wire, two-way digital communication circuits which eliminates the above-mentioned defects of conventional systems.

Another object of this invention is to provide a time-divisional connection system for a plurality of two-way digital communication circuits in which the repeating relay circuit for each digital communication circuit has no need of the additional function for checking direct-coupling between the sending terminal and the receiving terminal of each digital communication circuit.

Another object of this invention is to provide a time-divisional connection system for a plurality of two-way digital communication circuits in which signals of two-wire digital communication circuits and four-wire digital communication circuits can be handled by means of a single four-wire terminal equipment switchboard.

In the system of this invention, a time-serial character signal received from the input terminal of a communication circuit (e.g.; calling communication circuit) is converted, for each character, to a time-parallel character signal in a serial-parallel signal converter of the receiving side and transferred, for each character, to a parallel-serial signal converter of the sending side of another communication circuit (e.g.; called communication circuit) to convert therein the time-parallel character signal to a time-serial character signal for each character. The above-mentioned signal converters are also provided for the paths from the called communication circuits to the calling communication circuits. Detection means is provided to detect whether or not a time-serial character signal exists at either the receiving terminal or the sending terminal for each communication circuit; and control means is provided to interrupt, for the duration of the character detected, the path from the receiving terminal to the sending terminal for the communication circuit in response to the output of the detection means. By the use of the above-mentioned means, if a time-serial character signal is received from an input terminal of a communication circuit or sent out to an output terminal of another communication circuit to be connected to the former communication circuit, the sendout to the former communication circuit or the receiving from the later communication circuit is checked. The above-mentioned operations are performed time-divisionally for each path from the input terminal to the output terminal.

In accordance with another feature of this invention, the system of this invention may be provided with memory means for storing identifying binary information, predetermined for a plurality of two-wire or four-wire communication circuits to be connected to one another, to perform the above-mentioned check operation for two-wire communication circuits only.

The principle of this invention will be better understood from the following more detailed discussion in conjunction with the accompanying drawings, in which the same or equivalent parts are designated by the same or equivalent numerals, characters, and symbols, and in which.

Figure 1:
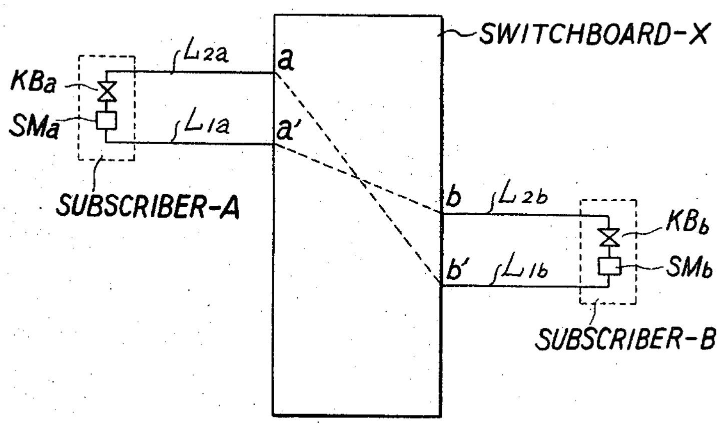
FIG. 1 is a connection diagram explanatory of the principle of the system of this invention.
Figure 2:
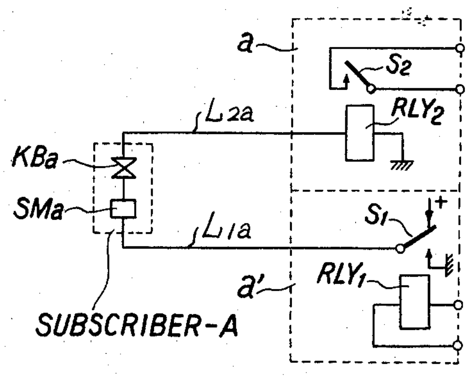
FIG. 2 is a connection diagram explanatory of an example of a repeating circuit employed in the system of this invention.

To permit a ready understanding of the this invention, the principle of connections from a subscriber A to a subscriber B through a switchboard X will first be described by way of example. Although a number of subscribers are connected to the switchboard X in the actual case, only two subscribers A and B are illustrated for explanation purposes. The subscriber A and the subscriber B are respectively connected to connection parts (*a*,*a'*) and (*b*, *b'*) through two-wire circuits $L_{1a}$ and $L_{2a}$ to the switchboard X. Examples of the connection parts (*a*, *a'*) are illustrated in FIG. 2. As understood from FIG. 2, the two-wire circuit connecting between the subscriber A and the switchboard X is converted to a four-wire circuit at the connection parts (*a*, *a'*).

In operation, a relay $RLY_1$ is controlled in accordance with a time-serial binary signal to be sent out to the subscriber A, so that a contact $S_1$ is switched between the plus potential (+) and the ground potential. Accordingly, an ON-OFF current flows through a loop: the plus potential (+), the contact $S_1$, the line $L_{1a}$, a selector magnet SM*a* and a keyboard KB*a*, the line $L_{2a}$, a relay $RLY_2$ and the ground. In this case, types corresponding to the time-serial binary signal are printed on a printer of the subscriber A (not shown) controlled by the selector magnet SM*a*. The connection parts (*b*, *b'*) are similarly constructed as the connection parts (*a*, *a'*).

If the subscribers A and B enter into communication with each other, the plus potentials (+) are applied to both the connection parts *a'* and *b'* and returned, through respective subscribers A and B, to the connection parts *a* and *b* at the idle time. In this case, if the subscriber A sends out a character by keying the keyboard KB*a*, this sentout character of time-serial signal is transfered through the line $L_{2a}$ and the connection part *a*, to the switchboard X and converted to a character of time-parallel signal in the switchboard X. The character of time-parallel signal is transferred to the sending side corresponding to the subscriber B and converted again to a character of time-serial signal, which is sent out to the subscriber B through the connection part *b'* and a line $L_{1b}$. Accordingly, a selector magnet $SM_b$ is ON-OFF controlled in accordance with a loop current flowing through a loop (the connection part *b'*, the line $L_{1b}$, the selector magnet $SM_b$, a keyboard KBb, a line $L_{2b}$ and the connection part *b*) in response to the character of time-serial signal sent out from the switchboard X, so that a type corresponding to the transmitted character is printed on a printer of the subscriber B (not shown).

As understood from the above operation, a character signal sent out from the connection part $a'$ or $b'$ is returned to the connection part $a$ or $b$ of the same two-wire circuit. However, this returned signal is effectively checked at respective receiving sides according to the feature of this invention as described in detail below, even though check means for checking such a loop current are not at all provided in each of the repeating circuits for respective two-wire circuits, such check means being essential in each of the repeating circuits for respective two-wire circuits in the conventional systems.

Figure 3:
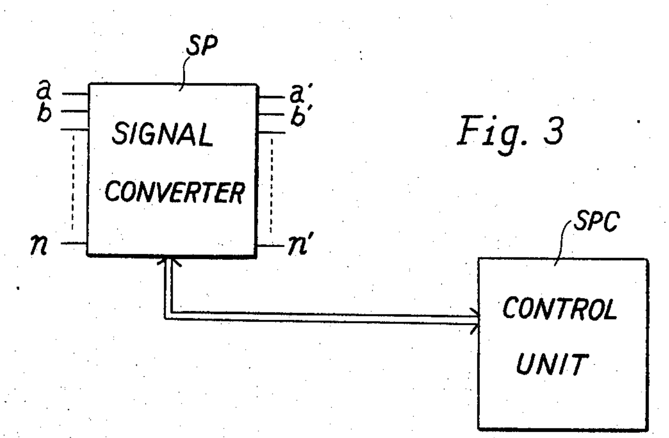
FIG. 3 is a block diagram explanatory of the construction of the system of this invention.

With reference to FIG. 3, the connection equipment or switchboard X of this invention comprises a signal converter SP and a control unit SPC. The signal converter SP has a first function of converting time-divisionally, for each of the input communication circuits, time-serial signals of the input communication circuits to time-parallel signals thereof, and to transfer the time-parallel signals to the control unit SPC, and a second function of converting time-divisionally, for each of output communication circuits, time-parallel signals of the output communication circuits transferred from the control unit SPC to time-serial signals thereof, and to send out the time-serial signals (hereinafter refered as "serial signal") to the output communication circuits. The control unit SPC has a function to transfer the time-parallel signals (hereinafter refered as "parallel signal") between one and the other of each pair of communicating input and output circuits.

Figure 4:
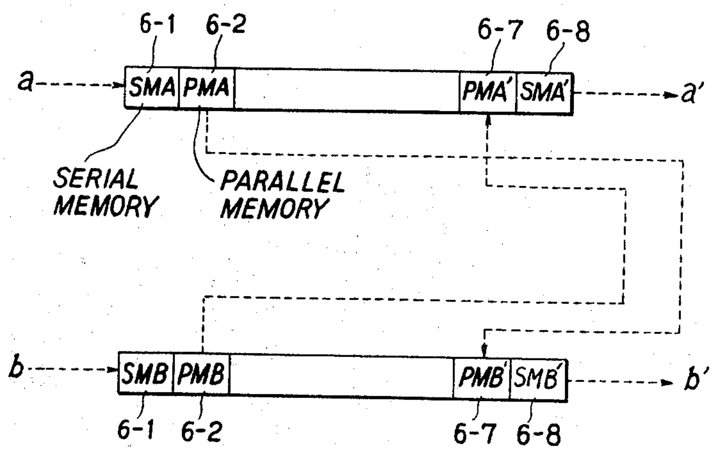
FIG. 4 is a block diagram explanatory of the construction of memory means employed in the system of this invention.

In the signal converter SP, memory zones are provided as shown in FIG. 4. In operation, if the subscribers A and B enter into communication therewith, a time-serial character received from the input connection part $a$ is sampled for each signal element and the sampled states of signal elements are successively stored in a serial-memory 6–1. When bits of binary information corresponding to one character have been stored in the serial-memory 6–1, this binary information is transfered to a parallel-memory 6–2 and further transferred, under control of the control unit SPC, to a parallel-memory 6–7. The binary information transfered to the parallel memory 6–7 is then transfered to a serial-memory 6–8, from which the binary information is sent out to the connection part $b'$. On the other hand, a serial signal received from the connection part $b$ is transfered to the connection part $a'$ through a serial-memory 6–1 (SMB), a parallel-memory 6–2 (PMB), a parallel memory 6–7 (PMA') and a serial-memory 6–8 (SMA').

Figure 5:
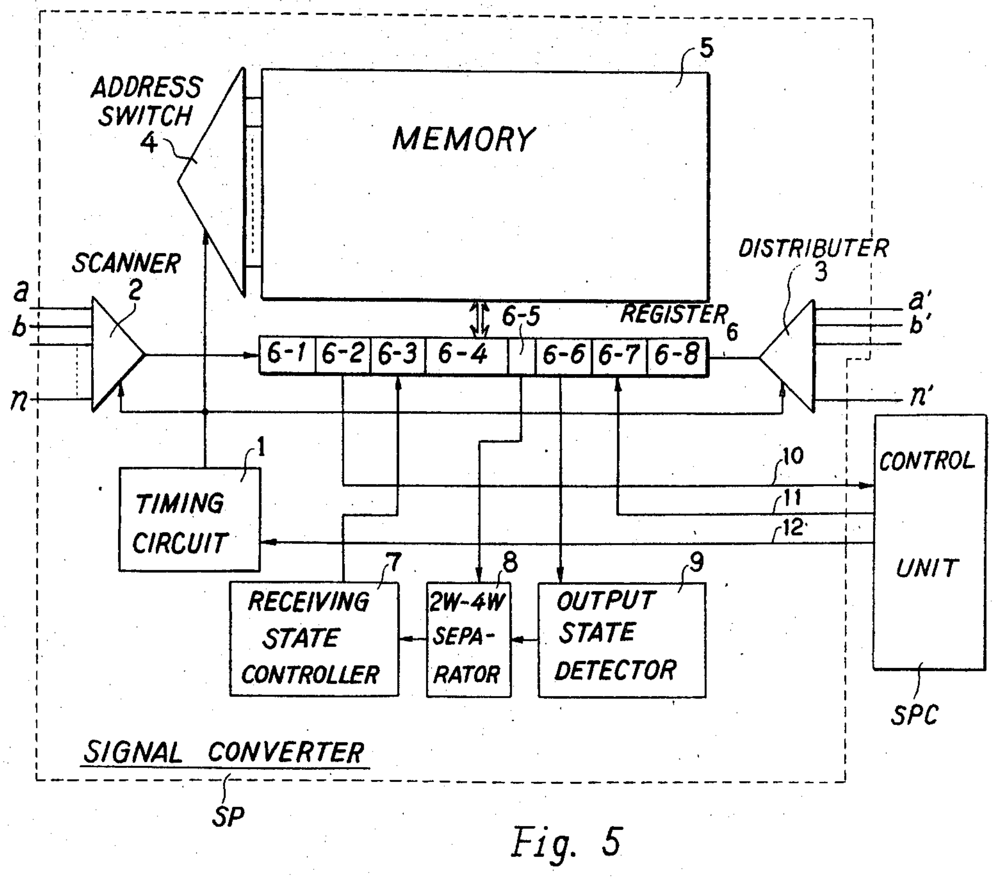
FIG. 5 is a block diagram illustrating an example of a signal converter employed in the system of this invention.

With reference to FIG. 5, the signal converter SP comprises a timing circuit 1, a scanner 2, a distributer 3, an address switch 4, a memory 5, a register 6, a receiving state controller 7, a 2W–4W separator 8, an output state detector 9, and other connection lines 10, 11 and 12. The timing circuit 1 comprises a ring counter for timing control of time-divisional operations in counting pulses of a clock pulse train and an interruption control circuit, to which an interruption control line 12 from the control unit SPC is connected and which applies address signals to the scanner 2, the distributer 3 and the address switch 4. The scanner 2 successively samples input signals from inputs $a, b, \ldots n$ by the use of the address signal supplied from the timing circuit 1. The distributer 3 distributes successively the output of the register 6 to outputs $a', b', \ldots n'$ by the use of the address signal supplied from the timing circuit 1. The address switch 4 designates addresses of the memory 5 so that the contents of the memory 5 are read out to the register 6. The above-mentioned operations of the scanner 2, the distributer 3 and the address switch 4 are carried out in a time-divisional manner for each of the communication circuits (i.e.; each subscriber A, B, . . . ) connected respectively to connection parts ($a, a'$), ($b, b'$), . . . ($n, n'$). The memory 5 stores binary information of respective communication circuits, and the contents of the memory 5 are successively read out to the register 6 and again stored to the memory 5 in synchronism with the address signal supplied from the timing circuit 1. The memory 5 has, for each communication circuit, memory zones respectively corresponding to memory zones 6–1, 6–2, 6–3, 6–4, 6–5, 6–6, 6–7 and 6–8 of the register 6. The memory zone 6–1 is a serial memory corresponding to the memories SMA and SMB shown in FIG. 4. The memory zone 6–2 is a parallel memory corresponding to the memories PMA and PMB shown in FIG. 4. The memory zone 6–3 stores binary information indicative of the conversion condition from the serial signal of the memory zone 6–1 to the parallel signal of the memory zone 6–2. For example, this conversion condition is indicated by the number of converted signal elements. The memory zones 6–8, 6–7 and 6–6 are employed for performing parallel-serial signal conversion to obtain serial signals which are distributed to output connection parts $a', b', \ldots n'$. The memory zones 6–8 and 6–7 are respectively a serial memory and a parallel memory, which correspond respectively to memory zones SMA' (or SMA') and PMA' (or PMB') shown in FIG. 4. The memory zone 6–3 stores binary information indicative of the conversion condition from the parallel signal of the memory zone 6–7 to the serial signal of the memory zone 6–8. This conversion condition, for example, is also indicated by the number of signal elements converted.

As understood from FIG. 5, the scanning of the input signals in the scanner 2, the distribution of the output signals at the distributer 3, and the readout-and writein between the memory 5 and the register 6 are performed in a time-divisional manner for each communication circuit in response to the address signal from the timing circuit 1. If no input signal is applied from a communication circuit, the memory 5 and the register 6 repeat readout-and-writein the memory contents for this communication circuit. However, if a call is sent from a subscriber (e.g.; subscriber A) to transmit a message to another subscriber (e.g.; subscriber B), this call is detected by the control unit SPC through the scanner 2, the register 6 and the connection line 10. In response to detection of this call, the control unit SPC applies an interrupting instruction to the timing circuit 1 through the connection line 12, so that the contents of the parallel memory zone 6–2 indicative of the character signal of the subscriber A is transferred through the line 10 to the control unit SPC and then transferred through the line 11 to the memory zone 6–7 at the time slot of the subscriber B in the time-divisional operation mentioned above. This interrupting operation is disclosed in detail in our copending U.S. Pat. Application Ser. No. 678,260 filed on Oct. 26, 1967.

In accordance with the features of this invention, the signal converter SP is further provided with the receiving state controller 7, the 2W–4W separator and the output state detector 9. The output state detector 9 is connected to the memory zone 6—6 of the register 6 and generates an output pulse in a case where the output signal is sent out from the register 6. A memory zone 6–5 of the register 6 stores binary information "1" or "0" which is predetermined in accordance with the two-wire connections or four wire of the respective communication circuits. The binary information "1" or "0" stored in the memory zone 6–5 is applied to the 2W–4W separator 8 (e.g.; gate) which passes the output pulse of the output state detector 9 therethrough only when the two-wire binary information "1" of the instant communication circuit is applied to the 2W–4W separator. The receiving state controller 7 is connected to the memory zone 6–3 of the register 6 and interrupts the serial-parallel signal conversion performed at the memory zones 6–1 and 6–2 only when an output pulse of the 2W–4W separator 8 is applied to the receiving state controller 7. As the result of the above-mentioned operation, the serial-parallel conversion at the input side is interrupted during the output character signal and is sent out from the register 6 under control of the control unit SPC to the distributer 3. The above operations are performed time-divisionally for each communication channel.

Figure 6:
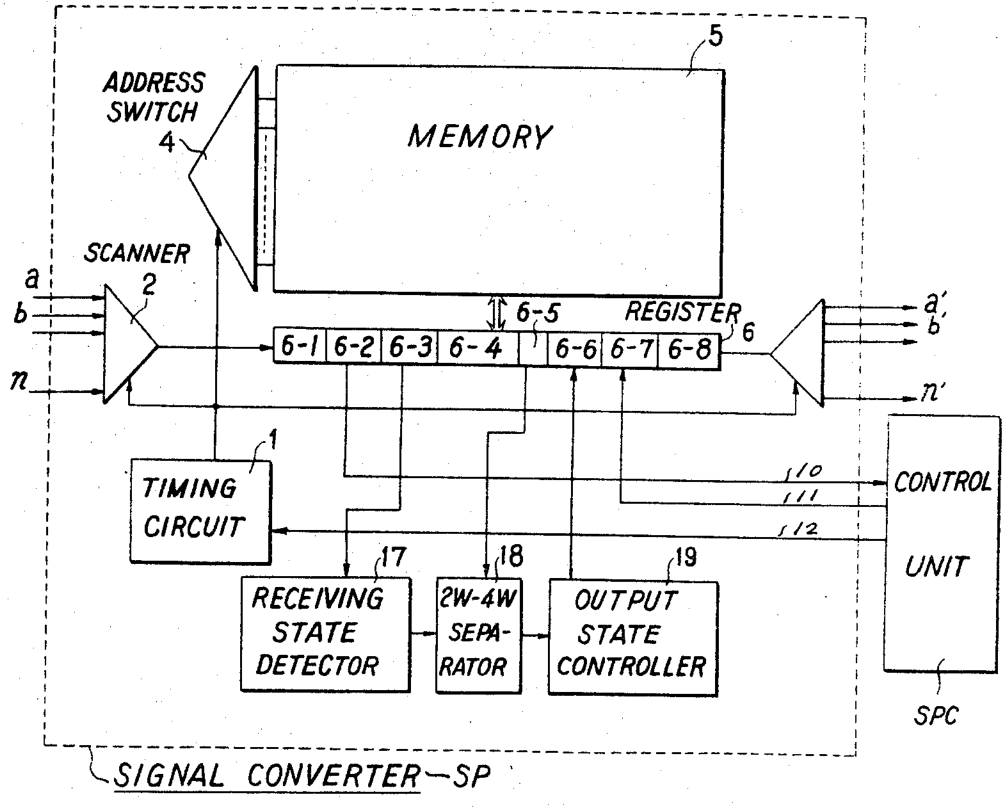
FIG. 6 is a block diagram illustrating an example of the signal converter employed in the system of this invention.

The above-mentioned interrupting operation of the path from the input side to the output side of the signal converter SP can be also performed as shown in an example of FIG. 6. In this example, a receiving state detector 17 generates an output pulse when the serial-parallel signal conversion in the input side is performed at the memory zones 6–1 and 6–2. A 2W–4W separator 18 is the same as the 2W–4W separator 8. Accordingly, if the two-wire binary information "1" of the instant communication circuit is applied from the memory zone 6–5 to the 2W–4W separator 18, the output pulse of the receiving state detector 17 is applied to an output state controller 19. The output state controller 19 interrupts the parallel-serial signal conversion performed at the memory zones 6–7 and 6–8 under control of the memory zone 6—6 and the control unit SPC. In this interrupted condition, the output of the instant communication circuit assumes an idle state. The other elements and their connections shown in FIG. 6 are the same as those indicated in FIG. 5.

The output state detector 9 and the receiving state detector 17 may be eliminated if each of the memory zones 6–3 and 6—6 stores a binary information indicative of performing the parallel-serial signal conversion or the serial-parallel signal conversion.

The above-mentioned former means 7, 8 and 9 and the latter means 17, 18 and 19 may be provided together. In this case, however, means are provided for determining the priority of operation for the former means and the latter means in accordance with the prior generation of the output pulse of the detector 9 or 17.

What we claim is

1. A time-divisional connection system for a plurality of two-way digital communication circuits, comprising:
   - input circuit path means and output circuit path means for each said two-way communication circuit for selectively isolating said plurality of digital circuits;
   - a plurality of input connection terminals respectively coupled to said input path means for receiving serial character signals from said two-way communication circuits;
   - first conversion means coupled in series with said input circuit path means and said input terminals for time-divisionally converting, for each input terminal of said two-way digital communication circuits, serial-character signals to parallel-character signals;
   - a plurality of output connection terminals respectively coupled to said output path means for sending out serial character signals to said two-way communication circuits;
   - second conversion means coupled in series with said output circuit path means and said output terminals for time-divisionally converting, for each output terminal of said two-way digital communication circuit, parallel-character signals to serial-character signals;
   - means operatively connected to the first and second conversion means for storing temporarily and time-divisionally the parallel-character signals from the first conversion means, and for transferring the stored parallel-character signals to the second conversion means at a desired time slot;
   - detection means for detecting time-divisionally, for each of said two-way communication circuits, whether or not a time-serial character signal exists at one of the input and output terminals; and
   - control means operatively connected to the first and second conversion means and the detection means for interrupting, time-divisionally, one of said input and output path means of any respective one of said two-way digital communication circuits when said detection means detects a digital signal in the other of said input and output path means of said one of said two-way digital communication circuits.

2. A time-divisional connection system according to claim 1, in which the detection means is operatively connected to the first conversion means to detect whether or not a time-serial character signal exists at the input terminal of each of said communication circuits, and in which the control means is operatively connected to the second conversion means to interrupt the parallel-serial signal conversion of the second conversion means during the duration of the character detected by the detection means.

3. A time-divisional connection system according to claim 1, in which the detection means is operatively connected to the second conversion means to detect whether or not a time-serial character signal exists at the output terminal of each of said communication circuits, and in which the control means is operatively connected to the first conversion means to interrupt the serial-parallel signal conversion of the first conversion means during the duration of the character detected by the detection means.

4. A time-divisional connection system according to claim 1, in which said input path means and output path means for each one of said digital communication circuits includes two-wire to four-wire conversion means, said system further comprising memory means for storing distinctive identifying binary information corresponding to each two-way digital communication circuit, addressing means for said memory means, and gate means connected between said detection means and control means to pass an output signal of the detection means corresponding to any one of said two-way digital communication circuits only in response to an addressing by said addressing means of said identifying binary information corresponding to said one two-way digital communication circuit.

* * * * *